United States Patent Office.

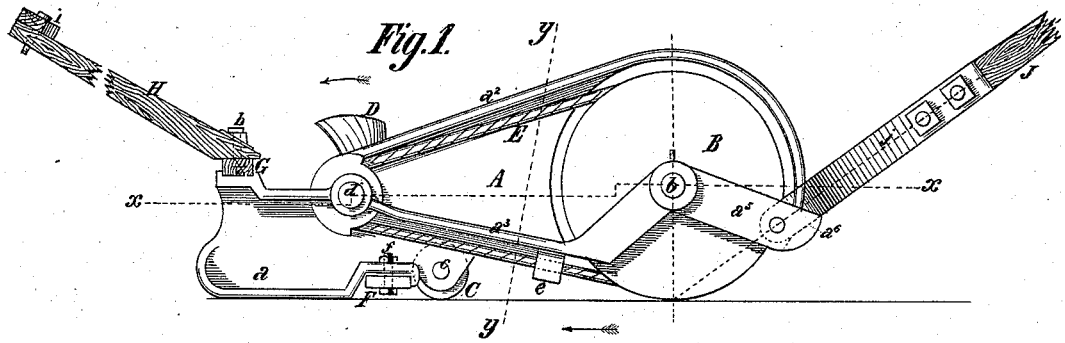
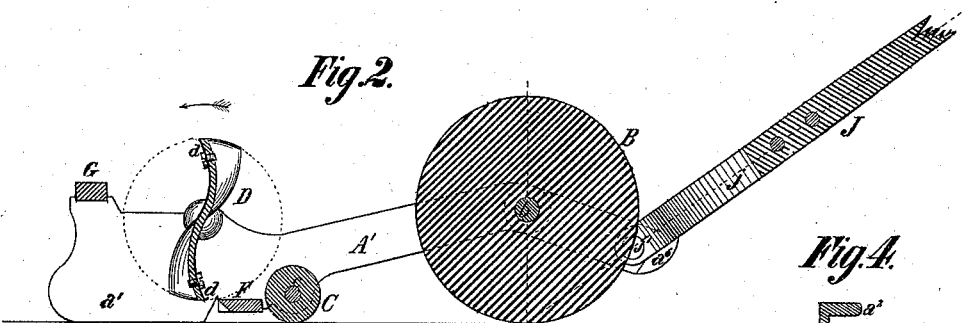
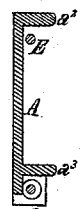
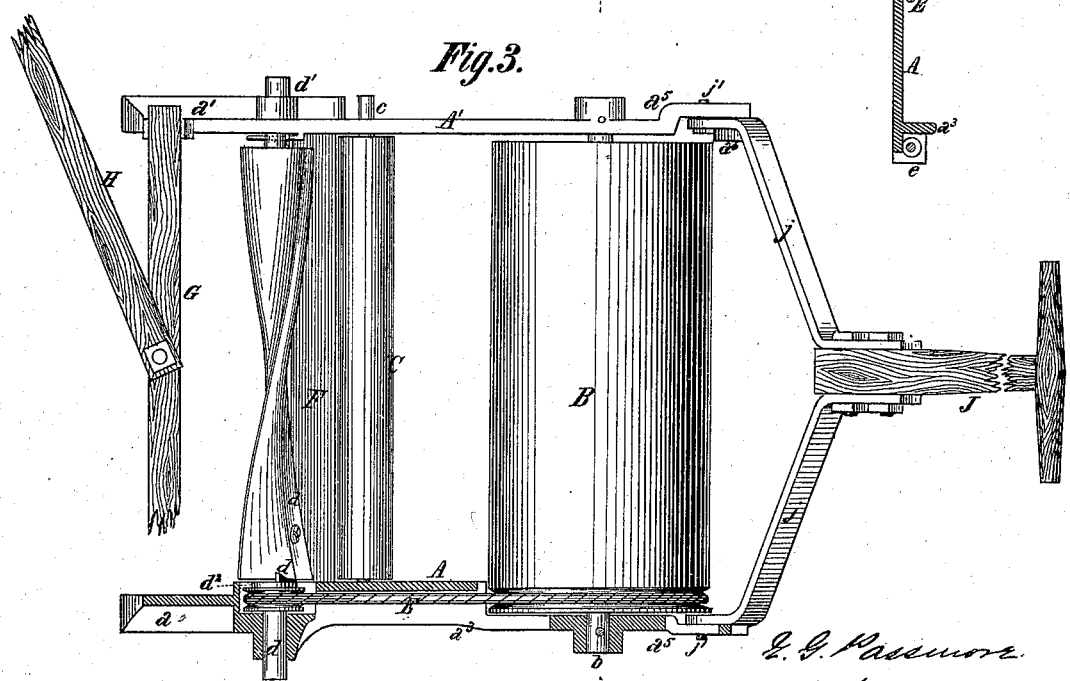

EVERETT G. PASSMORE, OF PHILADELPHIA, PENNSYLVANIA.

Letters Patent No. 113,336, dated April 4, 1871.

IMPROVEMENT IN LAWN-MOWERS.

The Schedule referred to in these Letters Patent and making part of the same.

*To all whom it may concern:*

Be it known that I, EVERETT G. PASSMORE, of the city and county of Philadelphia, in the State of Pennsylvania, have invented certain new and useful Improvements in Lawn-Mowers, of which the following is a specification, reference being had to the accompanying drawing, in which—

Figure 1 is a view in elevation of a lawn-mower embodying my improvements, as seen from that side on which the cutter-driving mechanism is mounted;

Figure 2, a vertical longitudinal central section through the same;

Figure 3, a plan or top view, partly in elevation and partly in section, at the line $x\ x$ of fig. 1; and Figure 4, a vertical section through the flanged frame, at the line $y\ y$ of fig. 1.

My improvements relate to a lawn-mower, the frame of which is mounted upon a drum or roller, and the fixed cutter of which is supported by a roller placed between it and the drum; and It is the object of my invention to secure increased traction of the drum without the use of any counterweight; to diminish the number of parts of the machine, and to leave an unobstructed space between the roller and drum, in which the cut grass may fall without being bunched; to simplify the driving mechanism; to protect the driving mechanism from obstruction or entanglement with the cut grass; to simplify and facilitate the method of throwing the spiral cutter into or out of gear; and to adapt the machine, when drawn by a horse, to cutting close to corners, around trees, &c.

In the accompanying drawing the frame of the machine is shown as composed of two side pieces, A A', supported upon and connected near their rear ends by a shaft, $b$, on which a drum, B, rotates freely.

At their front ends the frame-pieces extend downward, and form shoes $a\ a^1$.

In rear of the shoes are bearings, in which the shaft $c$ of a roller, C, which supports the front of the machine, rotates.

A spiral cutter, D, tipped with removable cutting-blades, $d$, and having journals $d^1$ at its ends, is mounted in bearings in the frame-pieces A A', and carries a driving-pulley, $d^2$, mounted loosely upon one of its journals inside the bearing thereof.

A projection or clutch, $d^3$, fig. 3, is formed upon the inner face of the pulley $d^2$, which, when rotated in contact with the spiral cutter D, imparts a corresponding movement of rotation thereto. When the spiral cutter is moved longitudinally in its bearings, so as to be withdrawn from contact with the clutch $d^3$, it will cease to rotate, although the machine continues its motion.

In this instance I have shown the spiral cutter as interlocked with the driving-pulley, and as prevented from moving endwise by a pin, $l$, passing through the cutter-shaft. The removal of this pin would leave the shaft free to be moved endwise. In practice a shipping-lever of ordinary construction would be substituted for the pin.

The pulley $d^2$ is driven by a belt or chain, E, from the drum B, which belt or chain is inside the bearings of the drum, that is to say, between the adjacent bearing and the center of the machine, as well as inside those of the spiral cutter, as before stated. When a chain is used it will be preferable to provide teeth upon the pulley and drum, which will take into the links of the chain.

By this arrangement I am enabled to use a driver for the belt or chain of nearly as great diameter as the drum, the latter being only recessed sufficiently to prevent the belt or chain from projecting beyond its periphery, and am also enabled to place it in a position where it is fully protected from injury or derangement in passing over rough and hilly ground.

For the distance between the bearings of the spiral cutter and the drum the side pieces A A' of the frame differ from each other in form. The piece A', which is on the side of the machine furthest from the driving mechanism, is a simple bar, of suitable strength, and of any desired cross-section. The piece A is of greater depth, and is provided with outward-projecting flanges $a^2\ a^3$, respectively, above the upper and lower sides of the belt or chain E, and serving to effectually cover and protect the same from being obstructed by the grass as it is cut.

A guide, $e$, is likewise formed upon it, through which the belt or chain passes, and is thereby maintained in proper relation to its pulleys.

A stationary cutter, F, is secured by bolts $f$ to the frame-pieces A A', beneath and slightly in rear of the axis of the spiral cutter D, and further serves as a transverse brace to this part of the machine. The spiral cutter, when rotated, shears off the grass between its edge and the edge of the stationary cutter, and throws it over the roller into the space between the latter and the drum. By interposing proper liners between the stationary cutter and the frame-pieces it may be raised or lowered as required.

A cross-bar, G, is secured to the frame-pieces A A', at their front ends, and has a swivel draft-pole, H, pivoted to it by a bolt, $h$.

The single-tree I, to which the horse is attached, is pivoted to the front end of the draft-pole, and the draft of the horse may thus be exerted either parallel with or at any angle to the center line of the machine, the draft-pole supporting the single-tree and traces, and preventing them from dropping upon the ground when the horse stops or slackens his motion.

The frame-pieces A A' are prolonged behind the drum-axle, so as to form downward and rearward-projecting brackets, $a^5$, to which a bail, composed of a handle, J, and connecting-straps $j$, is pivoted by bolts $j'$.

In operating the machine the straps rest upon inclines $a^6$ in the brackets $a^5$, in such position that the center line of the handle, if prolonged, would pass through the axis of the strap-pivots, and touch the ground at the point of contact therewith of the drum B. By this relation of the bail to the frame and drum the power of the operator is applied in such manner as to throw nearly all the weight upon the drum, thereby increasing its traction, and balancing the weight of the forward part of the machine, thus dispensing with counter or balance-weights, and correspondingly simplifying its construction.

When the machine is drawn by a horse, the draft-pole being swiveled, as hereinbefore described, the line of movement is still directed by the operator, who can by the bail guide the machine at an angle to the path of the horse.

The shoes run in advance of the roller and prevent it from sinking into soft ground, while the roller in turn sustains the shoes under like circumstances.

I am aware that frames, drums, rollers, fixed cutters, rotary cutters, shoes, and driving-gears, heretofore, have been combined in various ways in lawn-mowers, and do not, broadly, claim such devices, nor every mode of combining them.

What I claim as my invention, and desire to secure by Letters Patent, is—

1. The flanged frame-piece A, constructed as described, with a shoe, $a^1$, flanges $a^2$ $a^3$ to protect the driving-belt, a guide, $e$, through which the belt runs, bearings for the cutters, rollers, and driving-drums, and a stop, $a^6$, for the guiding-bail.

2. The combination of the grooved driving-drum, the flanged frame-piece, the pulley fixed therein, the driving-belt, the endwise-moving rotary cutter, and the clutch connection between the fixed pulley and the cutter, these parts being constructed and operating in combination, as herein set forth.

3. The combination of the frame, the driving-drum, the balancing guiding-bail pivoted behind and below the axis of the driving-drum, the shoes, the roller, and the horizontally-swinging draft-pole, to the front of which the horse is attached, these parts being constructed and operating as described.

EVERETT G. PASSMORE.

Witnesses:
  WM. B. DAYTON,
  J. SNOWDEN BELL.